United States Patent [19]

Hougen

[11] Patent Number: 4,952,102
[45] Date of Patent: Aug. 28, 1990

[54] ANNULAR HOLE CUTTER

[76] Inventor: Everett D. Hougen, G-5072 Corunna Rd., Flint, Mich. 48504

[21] Appl. No.: 326,137

[22] Filed: Mar. 20, 1989

Related U.S. Application Data

[63] Continuation of Ser. No. 178,829, Apr. 1, 1988, Pat. No. 4,813,819, which is a continuation of Ser. No. 909,398, Sep. 19, 1986, abandoned, which is a continuation of Ser. No. 787,039, Dec. 30, 1986, Pat. No. 4,632,610, which is a continuation of Ser. No. 522,181, Aug. 12, 1983, abandoned, which is a continuation-in-part of Ser. No. 423,704, Sep. 27, 1982, abandoned.

[51] Int. Cl.$^5$ ............................................. B23B 51/04
[52] U.S. Cl. ...................................... 408/204; 408/206
[58] Field of Search ............... 408/204, 206, 207, 223, 408/224

[56] References Cited

U.S. PATENT DOCUMENTS

| | | | |
|---|---|---|---|
| Re. 28,416 | 5/1975 | Hougen | 408/204 |
| 53,722 | 4/1866 | Wyckoff | 408/204 |
| 313,405 | 3/1855 | Davis | 408/186 |
| 2,662,428 | 12/1953 | Mueller | 408/204 |
| 3,244,035 | 4/1966 | Jehle et al. | 408/204 |
| 3,387,637 | 6/1968 | Ferguson | 408/204 |
| 3,430,526 | 3/1969 | Valenziano | 408/204 |
| 3,548,687 | 12/1970 | Holloway | 408/206 |
| 3,592,554 | 7/1971 | Takahara | 408/204 |
| 3,609,056 | 9/1971 | Hougen | 408/204 |
| 3,860,354 | 1/1975 | Hougen | 408/206 |
| 4,090,804 | 5/1978 | Haley | 408/204 |
| 4,230,429 | 10/1980 | Eckle | 408/204 |
| 4,322,188 | 3/1982 | Hougen | 408/224 |
| 4,408,935 | 10/1983 | Miyanaga | 408/204 |
| 4,452,554 | 6/1984 | Hougen | 408/204 |
| 4,516,890 | 5/1985 | Beharry | 408/204 |
| 4,586,857 | 5/1986 | Ohmi | 408/204 |
| 4,632,610 | 12/1986 | Hougen | 408/204 |
| 4,813,819 | 3/1989 | Hougen | 408/1 R |

FOREIGN PATENT DOCUMENTS

| | | | |
|---|---|---|---|
| 383221 | 10/1923 | Fed. Rep. of Germany | 408/204 |
| 1812669 | 12/1968 | Fed. Rep. of Germany | . |
| 2600225 | 1/1976 | Fed. Rep. of Germany | . |
| 142673 | 9/1980 | Fed. Rep. of Germany | . |
| 72595 | 6/1979 | Japan | 408/204 |
| 57-100415 | 6/1982 | Japan | . |
| 57-131210 | 8/1982 | Japan | . |
| 57-162021 | 10/1982 | Japan | . |
| 211407 | 12/1982 | Japan | 408/204 |
| 211408 | 12/1982 | Japan | 408/204 |
| 58-80117 | 5/1983 | Japan | . |
| K1422 | 1/1984 | Japan | . |
| K14080 | 1/1984 | Japan | . |
| 1055592 | 11/1983 | U.S.S.R. | . |
| 557335 | 11/1943 | United Kingdom | 408/206 |
| 2080162 | 2/1982 | United Kingdom | 408/204 |
| 2080711 | 2/1982 | United Kingdom | 408/223 |
| 2088755 | 6/1982 | United Kingdom | . |

OTHER PUBLICATIONS

Advertisement by Ohmi Kogyo Co., Ltd. of Boring Cutter and Metal Cutting Nibbler for Electric Drills (5/2/81).
News Article: Low-Output Borer Plate to Bore a Deep Hole, Ohmi Kogyo Co., Ltd. (4/14/81).
News Article: Well-Reputed Boring Cutter, Ohmi Kogyo Co., Ltd. (7/15/81).

*Primary Examiner*—Daniel W. Howell
*Attorney, Agent, or Firm*—Dykema Gossett

[57] ABSTRACT

An annular hole cutter wherein each tooth is formed with a radially outer cutting edge and at least alternate teeth are formed with radially extending, circumferentially staggered inner and outer cutting edges. The bottom face of each tooth is formed with oppositely radially inclined inner and outer back-off faces which intersect in a downwardly extending crest which in turn intersects the radially outer cutting edge. The outer back-off faces of alternate teeth are vertically relieved relative to the outer back-off faces of the intermediate teeth and the inner back-off faces of the intermediate teeth are vertically relieved relative to the inner back-off faces of the alternate teeth a distance greater than the chip load at which the cutter is operated. In the preferred form, the radially inner portion only of the unrelieved inner back-off face is relieved to a greater extent than the relieved inner back-off faces.

19 Claims, 4 Drawing Sheets

ANNULAR HOLE CUTTER

This is a continuation of co-pending application Ser. No. 07/178,829 filed on Apr. 1, 1988, now U.S. Pat. No. 4,813,819 which is a continuation of application Ser. No. 06/909,398, filed 9-19-86, now abandoned, which is a continuation of application Ser. No. 06/787,039, filed 12/30/86, now U.S. Pat. No. 4,632,610 which is a continuation of application Ser. No. 06/522,181, filed 8-12-83, now abandoned, which is a continuation-in-part of application Ser. No. 06/423,704 filed 9-27-82, now abandoned.

This invention relates to annular hole cutters.

Experience has shown that the life and the efficiency of a hole cutter; that is, the ease with which it can be fed through a metal workpiece, and the finish produced by an annular hole cutter are, to a very large extent, dependent upon the ease with which the chips are cut and the ease with which the chips being cut are enabled to flow away from the cutting edges and into and upwardly through the flutes around the outer periphery of the cutter. When the chips formed by an annular hole cutter cannot move freely away from the cutting edges and/or the flutes become packed or clogged with chips, the torque and thrust required to feed the cutter increases, the cutter wears more rapidly and the finish of the hole being cut deteriorates.

Previous attempts to increase the efficiency of annular hole cutters have met with some degree of success. For example, in my U.S. Pat. No. 3,609,056 there is illustrated an annular cutter wherein each tooth is designed to cut a single chip. The successive teeth are divided into groups of three and each tooth in each group is shaped to cut a chip having a width of about one-third the width of the tooth. In my U.S. Pat. No. Re. 28,416 there is disclosed an annular hole cutter wherein each tooth is formed with a plurality of radially extending, circumferentially staggered cutting edges. The bottom face of each tooth is formed with oppositely radially inclined back-off clearance faces which intersect in a downwardly extending crest which in turn intersects the radially outer cutting edge. Each cutting edge is designed to cut an individual chip. While each tooth cuts a plurality of chips, the configuration of the cutter is such that the widest chip has a width no greater than the depth of the flutes around the outer periphery of the cutter. In that particular cutter the web portion of the cutter side wall is formed with a single inner cutting edge. More recently cutters have been made which differ from those disclosed in U.S. Pat. No. Re. 28,416 in that, in the more recent cutters, the web portion of the cutter is formed with two circumferentially staggered cutting edges, rather than a single cutting edge. While these more recent cutters enable the use of a thicker web and a shallower flute, nevertheless they do not always perform satisfactorily, especially when used in a high production application.

I have determined that the difficulty encountered in attempting to obtain a free, unimpeded chip flow outwardly through the flutes of an annular cutter results primarily from the fact that, as soon as a chip is cut it expands in all directions. Thus, immediately after being cut a chip has a width greater than the width of the cutting edge by means of which it was cut. In the case of the cutters having circumferentially staggered cutting edges on each tooth, if the width of the chips cut by the inner cutting edges on each tooth is less than the depth of the flutes around the outer periphery of the cutter and if such chips are relatively stiff, then at least theoretically they should not tend to clog the flutes. However, the free flow of these narrow chips upwardly through the flutes is actually impeded in many cases by the chips cut by the outer cutting edges. In the cutters having circumferentially staggered cutting edges, the outer cutting edges terminate at their radially inner ends against a circumferentially extending shoulder on the cutter. Therefore, when the chip cut by such outer cutting edge expands, it tends to bind between this shoulder and the wall of the hole being cut. This impedes movement of the chip upwardly away from the cutting edge; a condition which requires increased torque and much greater thrust and leads to more rapid tool wear and inferior surface finish. Under certain conditions in cutting of some materials clogged flutes and broken blades frequently result.

The problem of binding of the chip cut by the outer cutting edge is obviously present in cutters of the type shown in U.S. Pat. No. Re. 28,416. In addition, where the inner cutting edge extends across the full thickness of the web between successive teeth, flow of the relatively wide chip cut by this inner edge radially outwardly into the adjacent flute is frequently impeded.

The primary object of this invention is to provide a cutter that cuts efficiently and is designed to promote a free unimpeded flow of chips through the flutes of the cutter from all cutting edges of the teeth.

Another object of this invention is to provide a cutter of the type previously described wherein the outer cutting edges are so designed as to cut a chip having a width substantially less than the width of the outer cutting edges and, thus, avoid the binding problem discussed above.

A further object of this invention is to provide an annular cutter with staggered cutting edges designed such that both the inner and outer cutting edges cut chips which are of less width than the respective cutting edges.

A more specific object of the present invention is to overcome the problem of binding of chips produced by the outer cutting edges of a fluted annular hole cutter having staggered inner and outer cutting edges by vertically relieving the outer back-off faces of every other tooth and vertically relieving the inner back-off faces of the intermediate teeth so that the radially outer portion of the outer cutting edge of one tooth cuts a heavy chip having a width substantially less than the width of the outer cutting edge and the radially inner portion of the outer cutting edge of the next successive tooth also cuts a heavy chip of approximately the same width, both of said chips being substantially narrower than the depth of the flute.

In the preferred form, the width of the inner cutting edge corresponds to the web thickness and the radially inner portion of the unrelieved inner back-off faces is relieved to a greater extent than the relieved back-off faces.

Other objects, features and advantages of the present invention will become apparent from the following description and accompanying drawings, in which:

Figure 1:
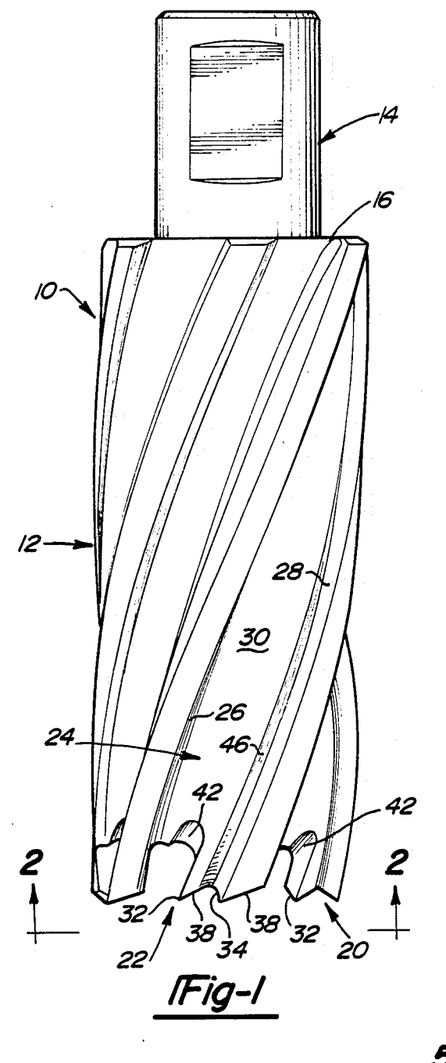
FIG. 1 is a perspective view of a cutter in accordance with the present invention.

The annular hole cutter of this invention is designed for forming holes in metal and is generally designated 10 in FIG. 1. The cutter includes a body 12 and a shank 14. Cutter body 12 is of inverted cup shape having a side wall 16 the length of which is greater than the thickness of the workpiece in which the hole is to be cut. The lower end of side wall 16 is formed around its periphery with a plurality of circumferentially spaced cutting teeth. In the embodiment illustrated the cutting teeth are divided into two groups, those of the first group being designated 18 and those of the second group being designated 20. The teeth 18,20 are alternately arranged so that one tooth 20 is disposed circumferentially between successive teeth 18. A spiral flute 22 extends upwardly around the outer periphery of the cutter adjacent each tooth. The successive flutes 22 are separated by a land 24 at the outer periphery of the cutter. The leading edge of each land 24 is formed with a narrow margin 25. The portions of the annular side wall 16 of the cutter between successive teeth 18,20 comprise webs 26. The radially outer face 28 of each web 26 defines the radially inner wall of each flute 22. The depth of flute 22 is approximately equal to or can be slightly greater or less than the thickness of web 26. Each flute includes a circumferentially leading side wall 30 and a circumferentially trailing side wall 32.

In the cutter illustrated in the drawings each tooth 18,20 is formed with three cutting edges 34,36,38. Cutting edge 38 has two portions 38a,38b as hereinafter explained. Cutting edge 34 is spaced forwardly in the direction of rotation from cutting edge 36 and cutting edge 36 is spaced forwardly in the direction of rotation from cutting edge 38. Cutting edge 34 is located at the lower end of the trailing face 40 of an inner gullet 42 formed in web 26. The upper end of gullet 42 inclines radially outwardly in an upward direction as at 44. Cutting edge 36 is located at the lower end of the trailing face 46 of a secondary gullet 48 which is also formed in web 26 directly adjacent inner gullet 42. The upper end of secondary gullet 48 is curved upwardly in a radially outward direction as at 50 above inner gullet 42. Cutting edges 34,36 are separated by a circumferentially extending shoulder 51 at the lower end of the radially inner face 52 of gullet 48. Cutting edge 38 is located at the lower end of the trailing face 32 of flute 22 and is spaced rearwardly from cutting edge 36 by a shoulder 54 at the lower end of flute 22.

Figure 3:
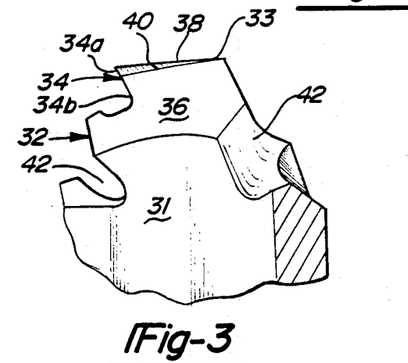
FIG. 3 is a fragmentary view of the cutter as viewed from the front face of one of the cutter teeth.
Figure 4:
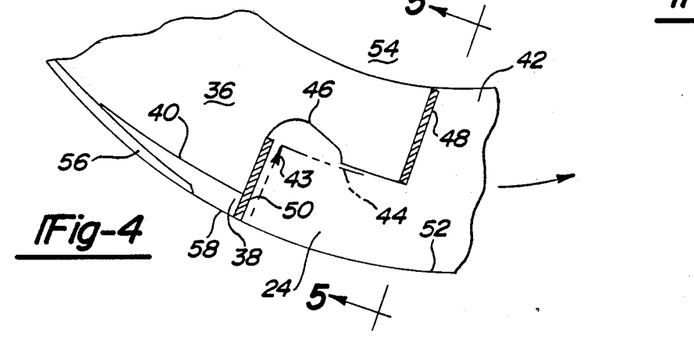
FIG. 4 is a bottom plan view of the tooth shown in FIG. 3.
Figure 5:
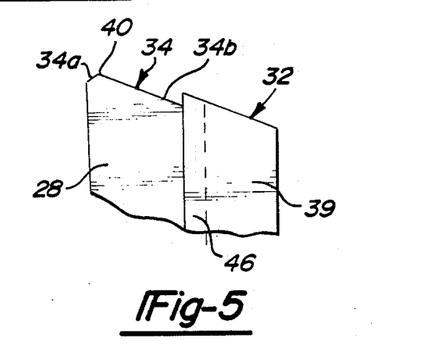
FIG. 5 is a fragmentary view of the tooth next successive to that shown in FIG. 3.
Figure 6:
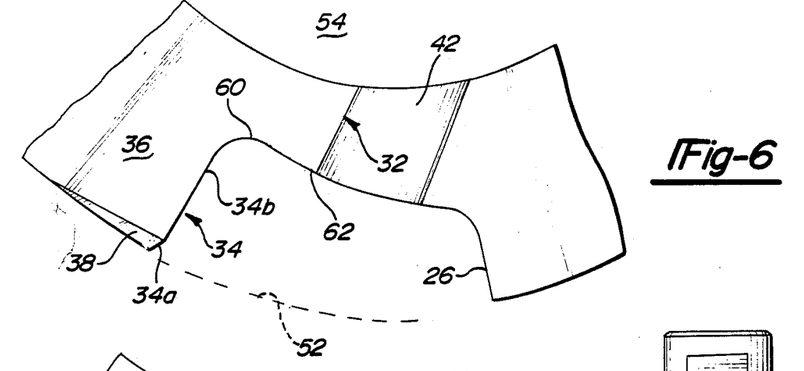
FIG. 6 is a bottom plan view of the tooth shown in FIG. 5.

The bottom face of each tooth is formed with two back-off clearance faces 56,58. In the operative condition of the cutter (FIG. 1), radially inner back-off face 56 inclines axially upwardly and radially inwardly while the radially outer back-off face 58 inclines axially upwardly and radially outwardly. In addition, each of these back-off faces inclines upwardly from its respective cutting edges in a circumferential direction to a slight extent, say 8° to 10°, to provide the necessary clearance for the cutting edges as the tool is rotated. The two back-off faces 56,58 intersect in a downwardly extending crest 60 which in turn intersects the radially outermost cutting edge 38 so as to divide it into a radially outer edge portion 38a and a radially inner edge portion 38b. The radial inclination of back-off face 58 is in the range of between about 5° to 35° to the horizontal and is preferably about 10°. The inner back-off face 56 inclines radially to the horizontal at an angle of between −3° to +25°, and preferably about 15°. As a result of the inclination of back-off faces 56,58 in both a radial and a circumferential direction, cutting edges 34,36,38 are not only staggered circumferentially as shown in FIGS. 4 and 6, but are also staggered vertically when viewed from the front face of the tooth as shown in FIGS. 3 and 5.

With the cutter thus far described the chips cut by the cutting edges 34,36 would be narrower than the depth of flutes 22 and would therefore be readily accommodated by the flutes. However, when the cutting edge 38 cuts a chip across its full width, as soon as this chip is cut, it expands and tends to bind between shoulder 54 and the wall of the hole being cut. The purpose of the present invention is to avoid this binding effect by having each outer cutting edge 38 cut a chip having a width less than the width of edge 38.

It will be observed that the crest 60 on the teeth 18 is disposed radially inwardly of the crest 60 on the teeth 20. The radially staggered crests 60 on the successive teeth of the cutter result from the fact that on each tooth 18 the back-off face 58 is vertically relieved throughout its radial extent upwardly relative to the back-off face 58 of each tooth 20. This in itself would result in crest 60 of each tooth 18 being disposed radially inwardly relative to crest 60 of each tooth 20. In accordance with the invention, the back-off face 56 of each tooth 20 is likewise relieved throughout its radial extent upwardly relative to the back-off face 56 of each tooth 18. The relieving of the back-off faces 56 of the teeth 20 displaces the crests 60 radially outwardly from the crests 60 on teeth 18 an additional extent.

The degree to which these back-off faces are relieved vertically is not critical, but, in any event, must be greater than the desired theoretical chip load on each tooth. For example, if a six-tooth cutter is advanced 0.012" per revolution, the theoretical chip load on each tooth is 0.002". Thus, if the theoretical chip load on each tooth is 0.002", then back-off faces 56,58 should be vertically relieved as described above a distance greater than 0.002". As a practical matter, assuming that a 0.002" chip load is a normal minimum chip load at which a tool may be operated and that a chip load of about 0.005" is a normal maximum chip load at which an annular cutter of this type is operated, then the vertical relief on the back-off faces 56,58 should be in the range of between 0.003 to 0.012". However, with large heavy cutters the feed rate may be such as to produce a chip load substantially in excess of 0.005"; then the relief may be as high as 0.020". As a practical matter, it is preferred to relieve these surfaces in the amount of about 0.007 to 0.010:, and preferably about 0.009". It should be appreciated that the maximum extent of relief is related to the radial inclination angles of the back-off faces and the width of the outer cutting edge so that, when relieved, crest 60 still intersects the outer cutting edge 38, not the intermediate cutting edge 36.

It is highly desirable to relieve the inner and outer back-off faces such that the crests of successive teeth are spaced approximately radially equally from the radial center line of the flute. When the crests are so located the outer cutting edges of successive teeth will cut chips of approximately equal width, each being only sightly wider than one-half the flute depth. This results in all chips having maximum clearance within the flutes 22.

Figure 7:
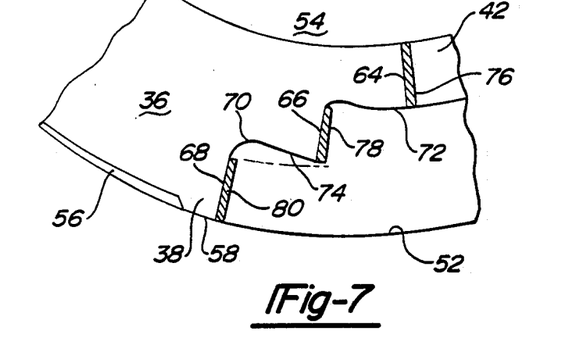
FIG. 7 is a view showing the progression of the successive teeth of the cutter into a workpiece.
Figure 8:
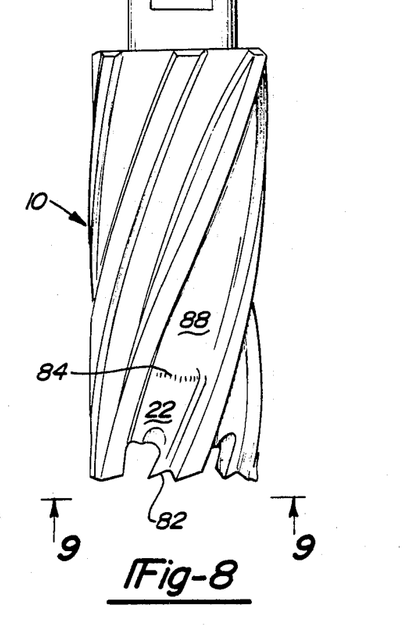
FIG. 8 is a perspective view of a modified cutter of the present invention.

The cutting action produced by the tool as heretofore described is best illustrated in the progressive views of FIG. 7. These views depict an annular cutter of the type described having six teeth. The teeth designated 1, 3 and 5 (indicated at the left of FIG. 7) correspond to the teeth 18 on which the back-off face 58 is vertically relieved and the teeth designated 2, 4 and 6 in FIG. 7 correspond to the teeth 20 on which the radially inner back-off face 56 is vertically relieved. The successive views of FIG. 7 progressing in a downward direction depict the action of the successive teeth of the cutter for successive rotational increments equal to the pitch between successive teeth.

In view a of FIG. 7 the cutter is illustrated at a position wherein the cutting edge 36 has just begun to penetrate the top surface of the workpiece and thus cut a narrow chip 62 from the top face of the workpiece. At this position the upwardly relieved cutting edge 38 of tooth #1 has not yet engaged the workpiece and the lowest point of cutting edge 34 is about to engage the workpiece. When the cutter has rotated one tooth pitch and advanced axially from the position shown in view a of FIG. 7, the cutting edge 38 of tooth #2 cuts into the workpiece to produce a chip 64. The cutting edges 34,36 on tooth #2 are vertically relieved a distance greater than the theoretical chip load produced by the axial feed rate and, thus, the cutting edge 36 is actually spaced above the groove previously formed by the corresponding edge 36 of tooth #1.

Upon the next increment of rotation and axial advance of the cutter (view c) the chip 62 produced by the cutting edge 36 of tooth #3 will be relatively thick since this cutting edge is not vertically relieved and cutting edge 34 of tooth #3 will cut the chip designated 66. The radially inner portion of cutting edge 38 on tooth #3 will initiate a cut and produce a chip 68. When the tool rotates through another increment (view d) the radially outer portion of cutting edge 38 cuts a wider and deeper groove than previously cut by edge 38 of tooth #2 so that chip 64 is wider and thicker than the chip produced by the inner portion of cutting edge 38 of the previous tooth. Since the edges 34,36 of tooth #4 are vertically relieved a distance greater than the chip load, they are spaced above the bottoms of the groove formed by the corresponding cutting edges of tooth #3. View e illustrates the cutting action of tooth #5 after an additional increment of rotation and feed. Cutting edges 34,36 are now cutting a full width chip 62,66, but only the radially inner portion of cutting edge 38 is effective so that the chip 68 cut thereby is wider than the chip cut by the inner portion of cutting edge 38 of tooth #3.

Although the chips 62,66 correspond in width with the cutting edges 36,34, respectively, and even though these chips expand somewhat immediately after being formed, they will not tend to bind within the cutter if they are relatively narrow because, as soon as chip 66 is formed, it is directed radially outwardly into the adjacent flute 22 by the upper face 44 of gullet 42. Likewise, as soon as chip 62 is formed, it is directed radially outwardly into the adjacent flute 22 by the upper surface 50 of the secondary gullet 46. Thus, the narrow chips formed by the cutting edges 34,36 are directed into the adjacent flute 22 immediately after being formed and, since the radial depth of flute 22 is substantially greater than the width of chips 62,66, they normally flow freely up the flute in an unimpeded manner.

From the showing in views e through j of FIG. 7 it will be observed that, after all of the cutting edges have penetrated into the workpiece, each of the cutting edges 38a and 38b will produce a chip of less width than the total width of cutting edge 38. Thus, the radially outer portion of edge 38 on each alternate tooth cuts a chip 64 and the radially inner portion of each cutting edge on the intermediate teeth cuts a chip 68. Consequently, since each of the chips 64,68 are narrower than the radial depth of flute 22, these chips move freely through the flutes.

Since the back-off faces 56,58 are alternately relieved vertically as described to an extent greater than the theoretical chip load, it will be appreciated that, after all the teeth have penetrated into the work, all of the chips are relatively thick and have an actual maximum thickness greater than the theoretical chip load. When chips are relatively thick, they tend to remain generally straight rather than tightly curled; therefore, they do not tend to intertwine with other chips and, thus, flow more readily upwardly through the flutes of the cutter. In addition, since all of the back-off faces 58 are inclined to the horizontal at a relatively low angle, preferably about 10°, the chips cut primarily by edge portion 38a are directed generally straight up the flute rather than radially inwardly against the radially inner face of the flute. This enhances the unimpeded free flow of all of the chips formed by the cutting edges upwardly through the flutes.

As pointed out previously, when the flow of chips away from the cutting edges and upwardly through the flutes is unimpeded, the torque and thrust required to drive the cutter are radically reduced. Likewise, the cutting edges are dulled at a much less rapid rate and the life of the cutter is prolonged. In addition, since the cutting edges remain sharp and since the chips do not bind against the wall of the hole being cut, the surface finish obtained is substantially superior to that obtained with prior art cutters.

Figure 2:
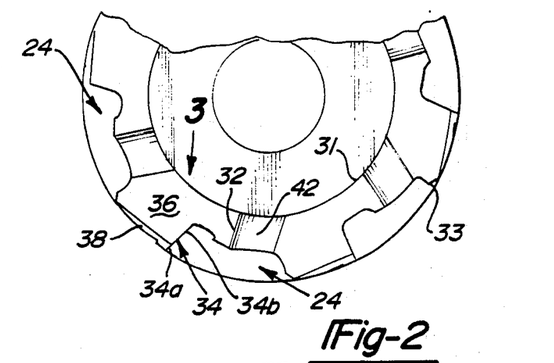
FIG. 2 is a fragmentary perspective view of the cutter.

In accordance with the present invention, the cutting edges 34,36 of only alternate teeth provide a cutting action. Since the cutting edges 34,36 of the teeth 20 (namely, the teeth numbered 2, 4 and 6 in the embodiment illustrated in FIGS. thru 7) do not perform any cutting, the cutting edges 34,36 on these teeth may be omitted entirely. This can be easily accomplished by grinding each tooth 20 completely along the width thereof as indicated by the broken radial line 70 in FIGS. 2 and 4. In this event only the teeth 18 will be provided with inner cutting edges 34,36. When the teeth 20 are formed with only a single outer cutting edge 38, the circumferential extent of each tooth 20 is relatively short and, since each tooth 20 will cut only a single narrow chip, the adjacent flute 22 can be substantially narrower circumferentially than the flutes adjacent the teeth 18 which must accommodate three narrow chips. Thus, when teeth 20 are formed with only a single cutting edge, a greater number of teeth can be formed on a cutter of a predetermined diameter. The greater number of teeth results not only in a stronger cutter, but also in more rapid cutting at the same surface speed. In addition, since only a portion of the cutting edges on each tooth is actually cutting, the remaining portions are readily inundated with coolant flowing downwardly through the passageway in the shank of the cutter so that the heat generated can be rapidly dissipated.

The cutter illustrated in FIGS. 8 thru 14 is generally of the type shown in U.S. Pat. No. Re. 28,416. It differs from the cutter previously described primarily in that each tooth is formed with only two cutting edges, rather than three, the inner cutting edge 35 extending across the full thickness of the web 26. For reasons hereinafter explained, even though the inner cutting edge 35 corresponds in width with the thickness of web 26, the web 26 can have a thickness equal to approximately one-half or slightly greater than the wall thickness of the cutter. Since the inner cutting edge 35 extends across the full width of the cutter, it is only necessary to provide a single gullet 42 between successive teeth.

Figure 9:
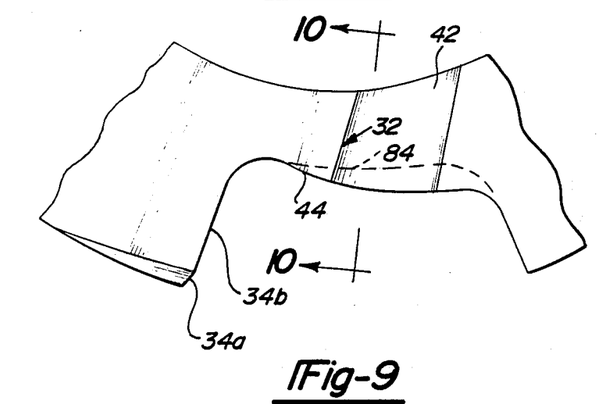
FIGS. 9, 10, 11, 12 and 13 are views of the modified cutter which correspond to FIGS. 2 thru 6, respectively.
Figure 10:
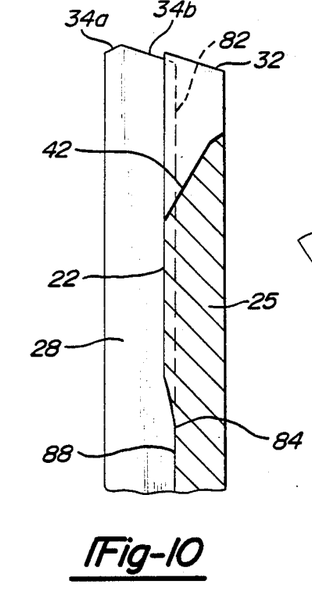
Figure 10A:
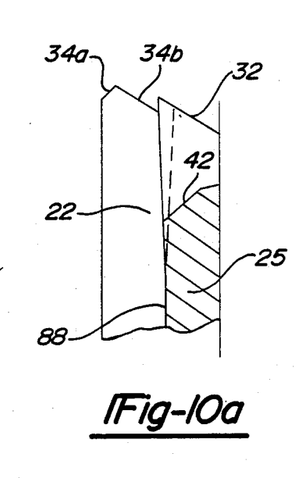
Figure 11:
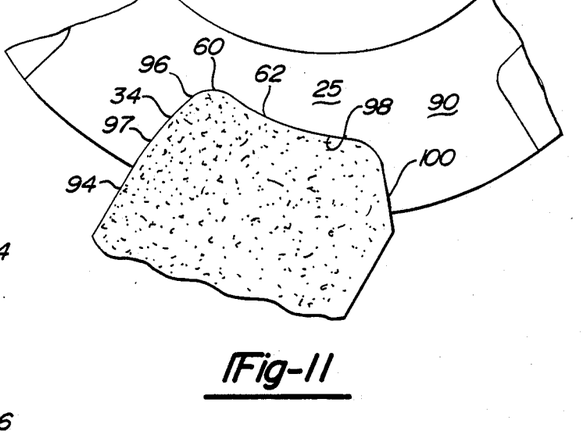
Figure 12:
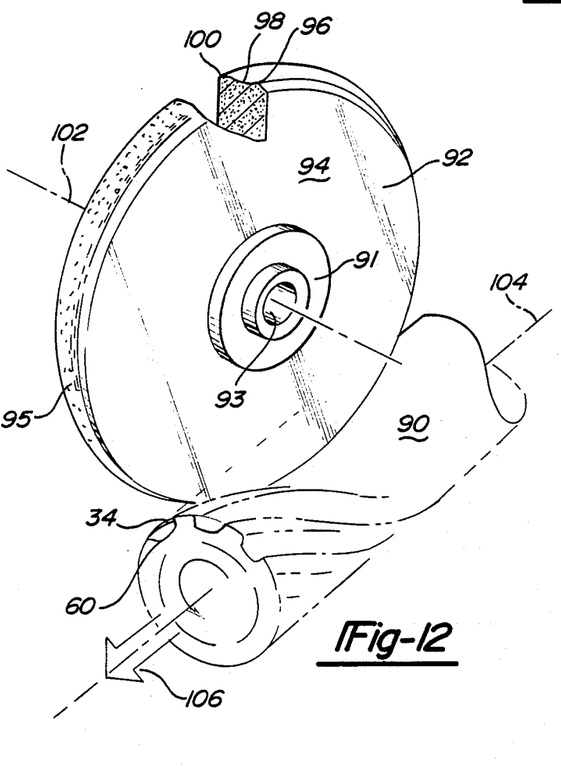
Figures 13, 14, 15, 16:
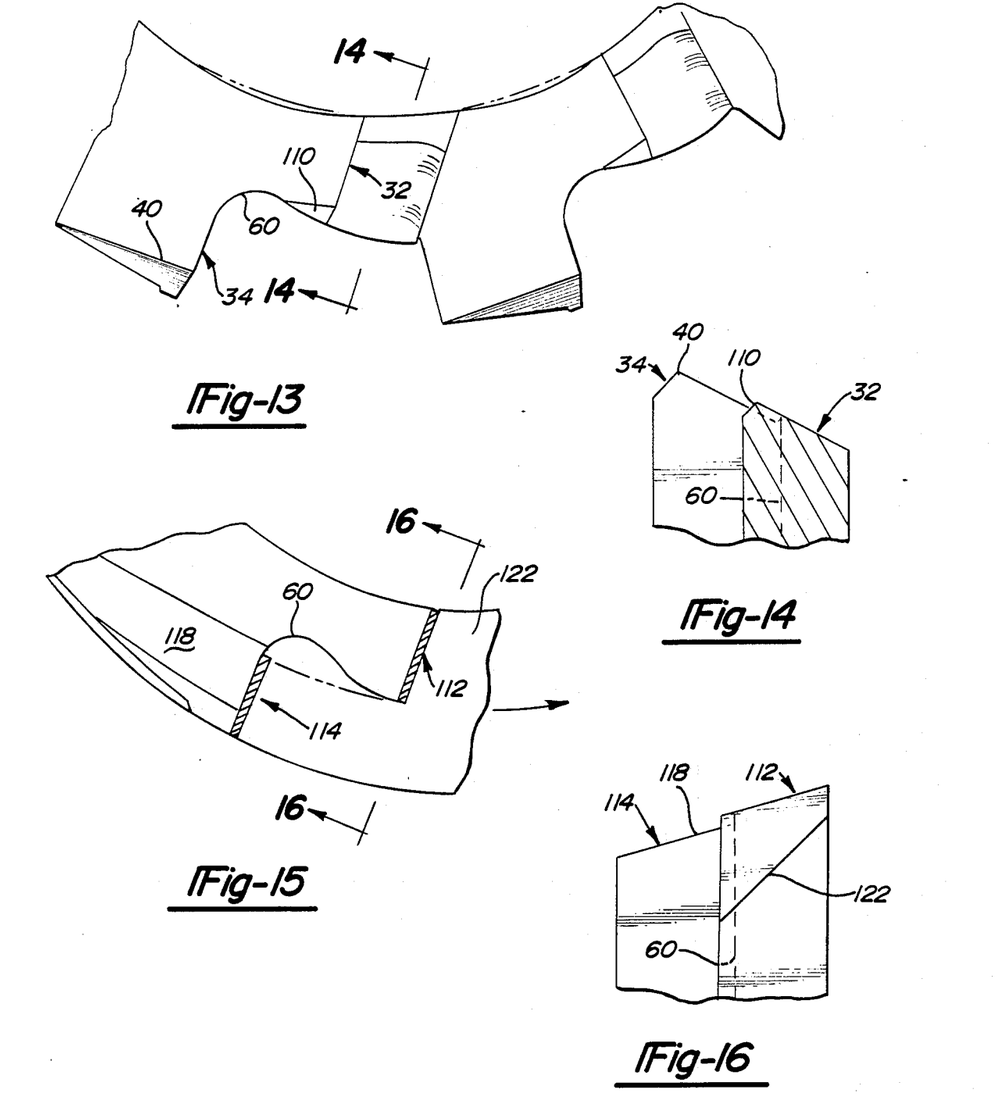
FIG. 14 is a view showing the progression of two successive teeth of the cutter into a workpiece in FIGS. 8 thru 13.
FIGS. 15 and 16 are fragmentary views of two successive teeth of a further modified form of cutter.
Figure 13:
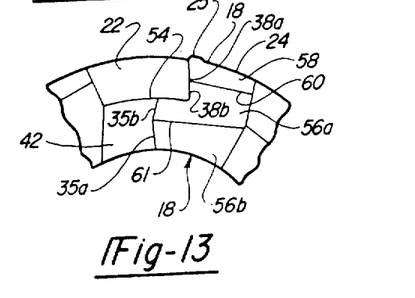
Figure 14:
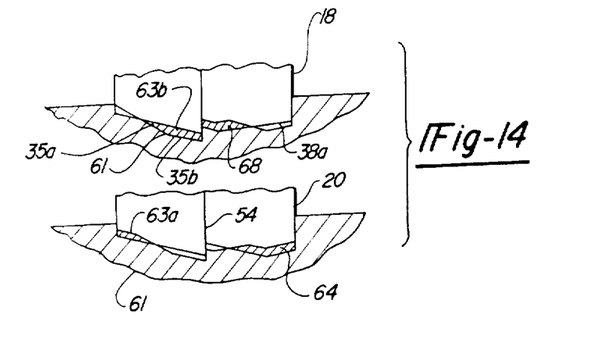
Figure 15:
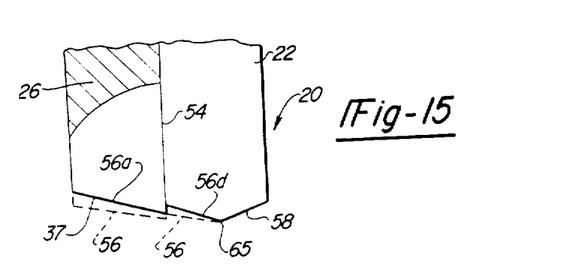
Figure 16:
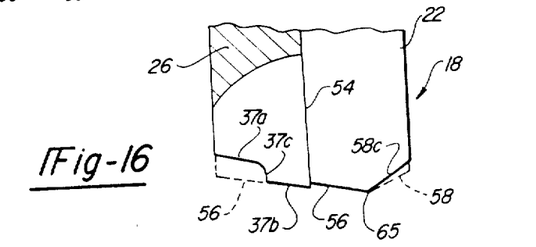

As in the previous embodiment described, the outer back-off faces 58 of teeth 18 are vertically relieved and the inner back-off faces 56 of teeth 20 are similarly relieved. Thus the crests 60 of the successive teeth are staggered radially in the same manner as the embodiment previously described. However, in the embodiment illustrated in FIGS. 8 thru 14 where the inner cutting edge 35 extends across the full thickness of web 26, the inner back-off faces 56 of the teeth 18 are relieved as shown in FIGS. 9, 12 and 13. These back-off faces are relieved upwardly through only a portion of their width; namely, the radially innermost portion. This divides the inner cutting edges 35 of teeth 18 into a radially inner portion 35a and a radially outer portion 35b. As shown in FIGS. 9 and 13, the back-off faces 56 of teeth 18 are relieved in this manner throughout their entire circumferential extent so that the back-off faces 56 are divided into two portions 56a and 56b, the line of intersection therebetween being designated 61.

At the cutting edge 35 the line of intersection 61 is preferably spaced radially inwardly from shoulder 54 a distance of between one-quarter and one-half the thickness of web 26. As explained hereinafter, this produces chips of desired size by the inner cutting edges. Since the inner back-off faces 56 of teeth 20 are relieved, in order to obtain the desired cutting action it is essential that the surfaces 56b of the teeth 18 relieved to a greater extent, preferably between two and three times the relief of back-off faces 56 of teeth 20. For example, if the back-off faces 56 of teeth 20 are relieved about 0.010", then the extent of relief of the back-off faces 56b of teeth 18 should be about 0.020 to 0.030" at the inner periphery of the cutter.

The cutting action produced by the tool shown in FIGS. 8 thru 13 is best illustrated in the progressive views of FIG. 14. Since the back-off faces 56,58 of the successive teeth are relieved in the same manner as in the previous embodiment described, it follows that the outer cutting edges 38 of the successive teeth will produce the chips designated 64 and 68 in FIG. 14 which are similar to the corresponding chips illustrated in FIG. 7. However, the inner cutting edges of the successive teeth will each cut a chip having a width less than the width of cutting edge 35. Since the back-off faces 56b of each tooth 18 are relieved as shown in FIGS. 12 and 13, it then follows that the radially outer portion of the cutting edge 35 on each tooth 18 will cut a chip, designated 63b in FIG. 14, and the radially innermost portion of the cutting edges 35 on each tooth 20 will produce a chip 63a. The widths of the chips 63a and 63b will depend upon the radial location of the line of intersection 61. Since the radially innermost chip 63a has to travel radially a greater distance to reach a flute 22 of the cutter, it is preferred that the chips 63a are dimensioned in width less than the chips 63b. Thus, as shown in FIG. 14 wherein the line of intersection 61 is spaced from the shoulder 54 a distance about one-third the thickness of web 26, the chip 63a is substantially narrower than the chip 63b.

A further modification of the invention is illustrated in FIGS. 15 and 16. The cutter illustrated in this embodiment is generally the same as that illustrated in FIGS. 8 thru 14 in that the cutter has a single cutting edge (designated 37) on the web portion of the cutter, but could have two cutting edges as illustrated in FIGS. 1 thru 7. The back-off faces of the successive teeth are alternately relieved as in the previous embodiments described, but in a slightly different manner. Thus, the teeth as originally formed have inner back-off faces 56 and outer back-off faces 58 which intersect in a downwardly extending crest 63. On each tooth 18 (FIG. 16) the outer back-off face 58 is vertically relieved from the crest 63 to the outer periphery of the cutter, as indicated at 58c. The extent of relief of the back-off face 58c at the outer periphery of the cutter is in the range previously referred to; namely, between 0.003 and 0.020" depending upon the intended chip load, and preferably in the range of about 0.007 and 0.010". In like manner, the inner back-off faces 56 of teeth 20 (FIG. 15) are vertically relieved upwardly the desired extent from crest 63 in a radially inward direction, as indicated at 56d. When the successive teeth are relieved in this manner the crests 63 of all teeth remain in the same axial and radial position. This is desirable in small diameter cutters having a few number of teeth. For example, when the cutter has only four teeth, all four crests 63 will engage the workpiece and initiate and cut at the same time and, thus, produce less chatter and greater accuracy than if only two of the crests initially engaged the workpiece.

FIG. 16 also illustrates a modified method of relieving the radially innermost portion of the inner cutting edge 37. In this modification the inner cutting edge of each tooth 18 is divided into radially inner and outer portions 37a and 37b by grinding a vertical shoulder on the inner back-off face 56, as indicated at 37c. As in the embodiment illustrated in FIGS. 8 thru 14, the vertical relief imparted to the cutting edge portion 37a should be greater, preferably between two and three times the relief provided at the inner edge 37 of the teeth 20. The location of the shoulder 37c in a radial direction is determined by the same factors which govern the location of the line of intersection 61 of the cutter illustrated in FIGS. 12 and 13; namely, the desired relative sizes of the chips produced by the successive inner cutting edges.

I claim:

1. An annular hole cutter comprising a generally cylindrical side wall provided with a plurality of alternate cutting teeth spaced circumferentially around the lower end thereof and a plurality of intermediate teeth interposed between said alternate teeth said plurality of alternate teeth configured differently than said plurality of intermediate teeth with each of said intermediate and alternate teeth having at least one cutting edge, a plurality of chip passages extending upwardly around the outer periphery of said side wall from said lower end with each of said cutting edges having a chip passage directly adjacent thereto, said cutting edges being configured to cut a plurality of chips from a workpiece with each chip having a width as measured generally radially which is less than the radial depth of said directly adjacent chip passage.

2. The annular hole cutter of claim 1, wherein said plurality of teeth have alternate cutting surfaces with every other tooth of said plurality of teeth having the same cutting surface and with said alternate cutting surfaces each cutting at least one chip.

3. The annular hole cutter of claim 1, wherein said plurality of teeth have alternate cutting surfaces with every other tooth of said plurality of teeth having the same cutting surface, said alternate cutting surfaces alternately cutting one single chip then more than one chip.

4. The annular hole cutter of claim 1, wherein said plurality of cutting teeth form a group of alternate cutting teeth and a group of intermediate cutting teeth interposed between said alternate cutting teeth, said one group of teeth has one cutting edge cutting a single chip and said other group of teeth has more than one cutting edge cutting more than one chip.

5. The annular hold cutter of claim 1, wherein each of said teeth has more than one cutting edge with each cutting edge cutting a single chip such that each tooth cuts more than one chip.

6. The annular hole cutter of claim 1, wherein said plurality of cutting teeth form a group of alternate cutting teeth and a group of intermediate cutting teeth interposed between said alternate cutting teeth, one group of teeth has radially inner and outer back-off faces extending circumferentially rearwardly and inclined upwardly from said cutting edge with each outer back-off face inclined downwardly in a radially inward direction and said outer and inner back-off faces intersecting in a generally circumferentially extending crest which, at its forward extents, intersects said cutting edge;

said other group of teeth has at least one back-off face extending circumferentially rearwardly and inclined upwardly from said cutting edge.

7. The annular hole cutter of claim 1, further including a plurality of flutes extending upwardly around the outer periphery of said cylindrical side wall from said lower end, said flutes being in communication with said chip passages;

said alternate and intermediate cutting teeth cooperating to cut chips from a workpiece to form an annular kerf having a radial width with neither said alternate nor said intermediate cutting teeth being configured to cut the full width of said kerf and with said chips formed by said cutting teeth being narrower as measured generally radially than the radial depth of said flutes.

8. An annular hole cutter comprising a generally cylindrical side wall with a plurality of alternate cutting teeth spaced circumferentially around the lower end thereof and a plurality of intermediate cutting teeth interposed between said alternate cutting teeth, said intermediate and alternate cutting teeth each having at least one cutting edge, and a plurality of flutes extending upwardly around the outer periphery of said side wall from said lower end with each of said cutting edges having a flute adjacent thereto;

said alternate and intermediate cutting teeth cooperating to cut chips from a workpiece to form a kerf having a specific radial width with neither said alternate nor said intermediate teeth being configured to cut the full width of said kerf and with said chips formed by said cutting teeth each being narrower as measured generally radially than the radial depth of said flutes;

whereby said chips may be discharged from said cutting edges and said kerf without interference.

9. The annular hole cutter of claim 8, wherein said plurality of teeth have alternate cutting surfaces with every other tooth of said plurality of teeth having the same cutting surface and with said alternate cutting surfaces each cutting at least one chip.

10. The annular hole cutter of claim 8, wherein said plurality of teeth have alternate cutting surfaces with every other tooth of said plurality of teeth having the same cutting surface, said alternate cutting surfaces alternately cutting one single chip then more than one chip.

11. The annular hole cutter of claim 8, wherein said plurality of cutting teeth form a group of alternate cutting teeth and a group of intermediate cutting teeth interposed between said alternate cutting teeth with one group of teeth having one cutting edge cutting a single chip and the other group of teeth having more than one cutting edge cutting more than one chip.

12. The annular hole cutter of claim 8, wherein each of said teeth have more than one cutting edge with each cutting edge cutting a single chip such that each tooth cuts more than chip.

13. The annular hole cutter of claim 8, wherein said plurality of cutting teeth are divided into first and second groups, each tooth of said first group having radially inner and outer back-off faces extending circumferentially rearwardly and inclined upwardly from said cutting edge, each outer back-off face being inclined downwardly in a radially inward direction and said outer and inner back-off faces intersecting in a generally circumferentially extending crest which, at its forward extent, intersects said cutting edge;

said second group of teeth having at least one back-off face extending circumferentially rearwardly and inclined upwardly from said cutting edge.

14. The annular hole cutter of claim 8, wherein said alternate teeth cut at least one chip from said kerf and said intermediate teeth cut at least two chips from said kerf.

15. The annular hole cutter of claim 8, wherein said alternate teeth cut at least one chip from the middle portion of said path and said intermediate teeth cut two chips, one chip from the outermost portion of said kerf and one chip from the innermost portion of said kerf.

16. The annular hole cutter of claim 8, wherein said alternate teeth cut two chips from the middle portion of said kerf and said intermediate teeth cut two chips from the outermost and innermost portion of said kerf.

17. An annular hole cutter comprising a generally cylindrical side wall provided with a plurality of cutting teeth spaced circumferentially around the lower end thereof and a plurality of flutes extending upwardly around the outer periphery of said side wall;

said teeth being divided into first and second sets, each tooth of said first set having radially inner and outer back-off faces extending circumferentially rearwardly and inclined upwardly from said cutting edge, each outer back-off face being inclined downwardly in a radially inward direction and said outer and inner back-off faces intersecting in a generally circumferentially extending crest which, at its forward extent, intersects said cutting edge;

said second set of teeth having at least one back-off face extending circumferentially rearwardly and inclined upwardly from said cutting edge;

said teeth of said first and second sets being alternately disposed circumferentially around said lower end of said cutter whereby said first set cuts at least one chip and said second set cuts at least two chips with all of said chips cut having a radial width as measured generally radially which is less than the radial depth of said directly adjacent flute;

said first and second sets of teeth cooperate to cut chips from a workpiece to form a kerf having a radial width with neither said first nor said second sets of teeth being configured to cut the full width of said kerf.

18. The annular hole cutter of claim 17, wherein said plurality of teeth have alternate cutting surfaces with every other tooth of said plurality of teeth having the same cutting surface, said alternate cutting surfaces alternately cutting one single chip then more than one chip.

19. The annular hole cutter of claim 17, wherein each tooth of one of set of teeth has one cutting edge cutting a single chip and each tooth of said other set has more than one cutting edge cutting more than one chip.

* * * * *

UNITED STATES PATENT AND TRADEMARK OFFICE
CERTIFICATE OF CORRECTION

PATENT NO. : 4,952,102

DATED : August 28, 1990

INVENTOR(S) : Everett D. Hougen

It is certified that error appears in the above-identified patent and that said Letters Patent is hereby corrected as shown below:

Delete the illustration on the title page and substitute figure 9 of the drawings.

Delete drawing sheets 1 through 4 and substitute the enclosed drawings, figures 1 through 16.

United States Patent [19]

Hougen

[11] Patent Number: 4,952,102
[45] Date of Patent: Aug. 28, 1990

[54] ANNULAR HOLE CUTTER

[76] Inventor: Everett D. Hougen, G-5072 Corunna Rd., Flint, Mich. 48504

[21] Appl. No.: 326,137

[22] Filed: Mar. 20, 1989

Related U.S. Application Data

[63] Continuation of Ser. No. 178,829, Apr. 1, 1988, Pat. No. 4,813,819, which is a continuation of Ser. No. 909,398, Sep. 19, 1986, abandoned, which is a continuation of Ser. No. 787,039, Dec. 30, 1986, Pat. No. 4,632,610, which is a continuation of Ser. No. 522,181, Aug. 12, 1983, abandoned, which is a continuation-in-part of Ser. No. 423,704, Sep. 27, 1982, abandoned.

[51] Int. Cl.$^5$ .............................................. B23B 51/04
[52] U.S. Cl. ...................................... 408/204; 408/206
[58] Field of Search ............... 408/204, 206, 207, 223, 408/224

[56] References Cited

U.S. PATENT DOCUMENTS

| Re. 28,416 | 5/1975 | Hougen | 408/204 |
|---|---|---|---|
| 53,722 | 4/1866 | Wyckoff | 408/204 |
| 313,405 | 3/1855 | Davis | 408/186 |
| 2,662,428 | 12/1953 | Mueller | 408/204 |
| 3,244,035 | 4/1966 | Jehle et al. | 408/204 |
| 3,387,637 | 6/1968 | Ferguson | 408/204 |
| 3,430,526 | 3/1969 | Valenziano | 408/204 |
| 3,548,687 | 12/1970 | Holloway | 408/206 |
| 3,592,554 | 7/1971 | Takahara | 408/204 |
| 3,609,056 | 9/1971 | Hougen | 408/204 |
| 3,860,354 | 1/1975 | Hougen | 408/206 |
| 4,090,804 | 5/1978 | Haley | 408/204 |
| 4,230,429 | 10/1980 | Eckle | 408/204 |
| 4,322,188 | 3/1982 | Hougen | 408/224 |
| 4,408,935 | 10/1983 | Miyanaga | 408/204 |
| 4,452,554 | 6/1984 | Hougen | 408/204 |
| 4,516,890 | 5/1985 | Beharry | 408/204 |
| 4,586,857 | 5/1986 | Ohmi | 408/204 |
| 4,632,610 | 12/1986 | Hougen | 408/204 |
| 4,813,819 | 3/1989 | Hougen | 408/1 R |

FOREIGN PATENT DOCUMENTS

| 383221 | 10/1923 | Fed. Rep. of Germany | 408/204 |
|---|---|---|---|
| 1812669 | 12/1968 | Fed. Rep. of Germany | |
| 2600225 | 1/1976 | Fed. Rep. of Germany | |
| 142673 | 9/1980 | Fed. Rep. of Germany | |
| 72595 | 6/1979 | Japan | 408/204 |
| 57-100415 | 6/1982 | Japan | |
| 57-131210 | 8/1982 | Japan | |
| 57-162021 | 10/1982 | Japan | |
| 211407 | 12/1982 | Japan | 408/204 |
| 211408 | 12/1982 | Japan | 408/204 |
| 58-80117 | 5/1983 | Japan | |
| K1422 | 1/1984 | Japan | |
| K14080 | 1/1984 | Japan | |
| 1055592 | 11/1983 | U.S.S.R. | |
| 557335 | 11/1943 | United Kingdom | 408/206 |
| 2080162 | 2/1982 | United Kingdom | 408/204 |
| 2080711 | 2/1982 | United Kingdom | 408/223 |
| 2088755 | 6/1982 | United Kingdom | |

OTHER PUBLICATIONS

Advertisement by Ohmi Kogyo Co., Ltd. of Boring Cutter and Metal Cutting Nibbler for Electric Drills (5/2/81).
News Article: Low-Output Borer Plate to Bore a Deep Hole, Ohmi Kogyo Co., Ltd. (4/14/81).
News Article: Well-Reputed Boring Cutter, Ohmi Kogyo Co., Ltd. (7/15/81).

*Primary Examiner*—Daniel W. Howell
*Attorney, Agent, or Firm*—Dykema Gossett

[57] ABSTRACT

An annular hole cutter wherein each tooth is formed with a radially outer cutting edge and at least alternate teeth are formed with radially extending, circumferentially staggered inner and outer cutting edges. The bottom face of each tooth is formed with oppositely radially inclined inner and outer back-off faces which intersect in a downwardly extending crest which in turn intersects the radially outer cutting edge. The outer back-off faces of alternate teeth are vertically relieved relative to the outer back-off faces of the intermediate teeth and the inner back-off faces of the intermediate teeth are vertically relieved relative to the inner back-off faces of the alternate teeth a distance greater than the chip load at which the cutter is operated. In the preferred form, the radially inner portion only of the unrelieved inner back-off face is relieved to a greater extent than the relieved inner back-off faces.

19 Claims, 4 Drawing Sheets

UNITED STATES PATENT AND TRADEMARK OFFICE
CERTIFICATE OF CORRECTION

PATENT NO. : 4,952,102

DATED : 8/28/90

INVENTOR(S) : Everett D. Hougen

It is certified that error appears in the above-identified patent and that said Letters Patent is hereby corrected as shown below:

In claim 5, line 29, delete the word "hold" and add --hole--.

Signed and Sealed this

Twenty-second Day of December, 1992

*Attest:*

DOUGLAS B. COMER

*Attesting Officer*   Acting Commissioner of Patents and Trademarks